2,969,405
PROCESS FOR PREPARING 1,3,5-TRIPHENYL-BENZENE

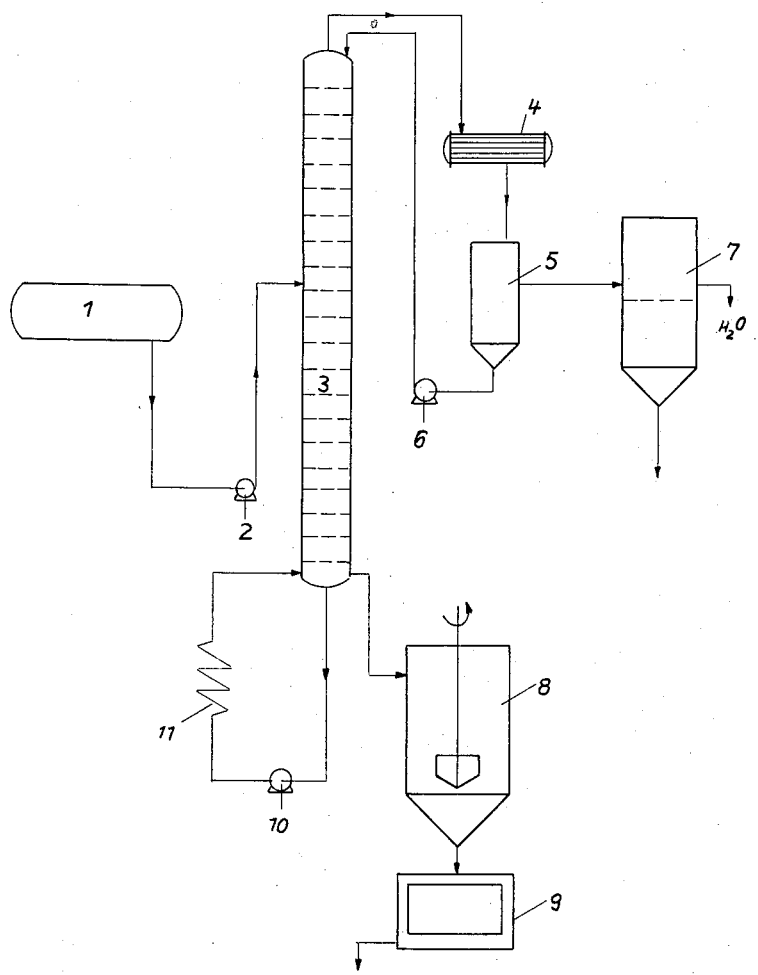

Walter Metzger and Heinz F. Schünemann, Letmathe, Westphalia, Germany, assignors to Rutgerswerke-Aktiengesellschaft, Frankfurt am Main, Germany Filed Dec. 16, 1958, Ser. No. 780,832

Claims priority, application Germany Dec. 24, 1957

5 Claims. (Cl. 260—668)

This invention relates to the preparation of 1,3,5-triphenyl-benzene and it has particular relation to the condensation of 3 mols of acetophenone to 1,3,5-triphenyl-benzene with the splitting off of water.

Condensation of acetophenone to 1,3,5-triphenyl-benzene has been known in the art and was carried out mostly with the use of hydrochloric acid as the condensing agent, because it was found that condensation of the acetophenone does not take place uniformly according to the desired condensation reaction in the use of other condensing agents (see Beilstein, Handbuch der Organischen Chemie, 4th Edition, vol. 5, page 377).

It has now been found that acetophenone can be condensed by proceeding in the manner described hereinafter in the presence of a small amount of an aromatic sulfonic acid, on a commercial scale with good yields of 1,3,5-triphenyl-benzene of bright color and of a degree of purity which meets industrial requirements and can be increased, if desired, by recrystallization of the condensation product from benzene, methanol, toluene or acetophenone.

Further, it has been found that the water split-off in the course of the reaction must not exceed 0.7 mole/mole of acetophenone in order to avoid the formation of resinous by-products which will inhibit the crystallization of the 1,3,5-triphenylbenzene in the reaction mass.

Intermediate of this process is dypnone which reacts with a further mole of acetophenone to form 1,3,5-triphenyl-benzene. Therefore it is necessary to maintain an excess of acetophenone to prevent side-reactions of the dypnone which will cause the formation of said resinous by-products.

Example 1

The starting material is technically pure acetophenone which boils in the range between 196° C. and 202° C. under normal atmospheric pressure and has a solidification point of 10°–15° C. This starting material is mixed with 5% by weight of toluenesulfonic acid,

$C_6H_4(SO_3H)CH_3$ based on the weight of acetophenone, and the mixture is stored in vessel 1 shown in the appended diagrammatic illustration.

Through a centrifugal pump 2 the mixture is continuously fed to a distillation column 3 which has about 30 bubble trays of conventional design. To the distillation system shown heat is supplied in such amount that from the head of the column water-containing acetophenone is distilled off. Part of this acetophenone is reintroduced into the distillation system as reflux as shown at 4, 5, 6. Or this water-containing acetophenone is collected in container 7, from which water and acetophenone can be discharged. The discharged acetophenone can be reintroduced into the process. The time of stay in the reaction system is chosen as to effect a splitting-off of water of about 0.3 to 0.5 mole/mole acetophenone which is continuously fed to the system. The temperature in the column sump is kept at 250° C. Heating is supplied to the reaction system by forcing the material accumulating in the sump by means of a pump 10 through a tube furnace 11 and thus keeping said material in circulation. The sump material is discharged continuously so that a substantially constant level is maintained in the sump.

The discharged dark sump product is allowed to cool in a container 8 until the 1,3,5-triphenyl-benzene is solidified, and is then subjected to centrifuging in a centrifuge 9. The liquid separated in the centrifuge is introduced into container 1. The crude 1,3,5-triphenyl-benzene is removed from the centrifuge. Based on the weight of acetophenone introduced into the process, about 25% of crude 1,3,5-triphenyl-benzene are thus obtained.

Example 2

In the above Example 1, 5% by weight of naphthalene-sulfonic acid are substituted for the toluene-sulfonic acid used in said Example 1, the details of the procedure being substantially the same as in Example 1. 20% of technically pure 1,3,5-triphenyl-benzene are obtained, based on the acetophenone charge.

It has been found that the above described process can be carried out in apparatus consisting of iron, because the acetophenone counteracts corrosion.

It will be understood that the present invention is not limited to the specific conditions and details described above and can be carried out with various modifications without departing from the scope of the invention as defined in the appended claims. For example, the acetophenone used as starting material is fed to the distilling column with a temperature of 20 to 180° C. The product accumulating in the sump of the distillation column is kept at a temperature in the range of 200 to 265° C., preferably at 245 to 255° C. By maintaining this last mentioned temperature, the discharged sump product will contain about 20% of 1,3,5-triphenyl-benzene whereby the reaction mixture passing through the distillation system from feed to discharge is subjected to heating to condensation temperature, the time depending on the capacity of the apparatus. The sulfonic acid catalyst is used in an amount of 2% to 10% based on the weight of the acetophenone introduced as starting material into the process. It will be understood that the present invention is not limited to the specific conditions of a continuous reaction but may also be carried out as a batch process in a way known to the art for such processes of splitting-off water.

It will be understood that this invention is not limited to the specific steps, conditions and other details specifically described above and can be carried out with various modifications. For example, the condensation catalyst used in the above Example 1 may be benzene sulfonic acid, ortho-toluenesulfonic acid or para-toluenesulfonic acid or a mixture of these acids and the condensation catalyst used in the above Example 2 may be alpha-naphthalenesulfonic acid or beta-naphthalenesulfonic acid or a mixture of these acids. In addition to these sulfonic acids sulfonic acids of other aromatic compounds may also be used, as examples of which the following are mentioned: benzenemonosulfonic acid; naphthalene-1,5-disulfonic acid; naphthalene-2,7-disulfonic acid; 1,3,6-napththalene trisulfonic acid. The mono-sulfonic acid formed by the action of acetophenone with concentrated sulfonic acid at water-bath temperature can be also used as a catalyst and it has been found that in general sulfonic acids of mononuclear and binuclear aromatic compounds consisting of 6-membered rings or mixtures of these sulfonic acids are suitable for use as catalysts in carrying out the process of this invention.

The melting point of the crude end product obtained in the above Example 1 is 169° C. The melting point of the technically pure product described in the above Example 2 amounts to 169° C.

The parts mentioned above are by weight if not otherwise stated.

What is claimed is:

1. A process for preparing 1,3,5-triphenyl-benzene by condensation of acetophenone, comprising mixing acetophenone with a catalytic amount of an aromatic sulfonic acid; continuously introducing the resulting mixture into a distilling column in which condensation of the acetophenone to 1,3,5-triphenyl-benzene is carried out at elevated temperature in the presence of excess acetophenone; distilling off a mixture of water and acetophenone at the head of the column, the amount of water split off in the reaction not exceeding 0.7 mol per mol acetophenone; keeping the temperature in the sump of the column in the range of 200° to 265° C. and continuously discharging the product accumulating in the sump.

2. A process as claimed in claim 1, in which the sulfonic acid catalyst is used in an amount of 2 to 10% based on the weight of acetophenone used as starting material.

3. A process as claimed in claim 1, in which the discharged sump product is subjected to cooling and subsequntly to centrifuging in order to separate the 1,3,5-triphenyl-benzene from accompanying liquid and said liquid is reintroduced as starting material into the process.

4. A process as claimed in claim 1, in which the acetophenone distilled off at the head of the distilling column is separated from water and reintroduced into the process as a starting material.

5. A process as claimed in claim 1, in which the condensation catalyst consists of at least one sulfonic acid selected from the group consisting of sulfonic acids of mononuclear and binuclear aromatic compounds consisting of 6-membered rings.

References Cited in the file of this patent

UNITED STATES PATENTS

| | | |
|---|---|---|
| 2,377,433 | Lieber | June 5, 1945 |
| 2,390,835 | Hennison et al. | Dec. 11, 1945 |
| 2,443,732 | Ipatieff et al. | June 22, 1948 |
| 2,462,792 | Wadsworth et al. | Feb. 22, 1949 |
| 2,554,269 | Ruggeberg | May 22, 1951 |
| 2,564,077 | Proell | Aug. 14, 1951 |